United States Patent [19]
Yokota

[11] Patent Number: 5,825,731
[45] Date of Patent: Oct. 20, 1998

[54] DISC RECORDING MEDIUM HAVING SUBSIDIARY DATA IN WHICH IS STORED AN IDENTIFIER

[75] Inventor: Teppei Yokota, Chiba, Japan

[73] Assignee: Sony Corporation, Japan

[21] Appl. No.: 753,675

[22] Filed: Nov. 27, 1996

[30] Foreign Application Priority Data

Dec. 7, 1995 [JP] Japan .................................. 7-318956

[51] Int. Cl.⁶ ........................................................ G11B 5/09
[52] U.S. Cl. ............................................. 369/48; 369/58
[58] Field of Search .............................. 369/48, 47, 32, 369/33, 54, 275.3, 58, 284, 283

[56] References Cited

U.S. PATENT DOCUMENTS

| | | | |
|---|---|---|---|
| 5,058,162 | 10/1991 | Santon et al. | 380/25 |
| 5,473,106 | 12/1995 | Miyashita et al. | 84/609 |
| 5,544,139 | 8/1996 | Aramaki et al. | 369/58 |
| 5,745,454 | 4/1998 | Yokota | 369/48 |
| 5,754,521 | 5/1998 | Yokota | 369/275.3 |

FOREIGN PATENT DOCUMENTS

| | | |
|---|---|---|
| 0406021 A2 | 1/1991 | European Pat. Off. . |
| 0553545 A2 | 8/1993 | European Pat. Off. . |
| 0626689 A2 | 11/1994 | European Pat. Off. . |
| 0635835 A2 | 1/1995 | European Pat. Off. . |
| 0668695 A2 | 8/1995 | European Pat. Off. . |
| 4312922 A1 | 10/1993 | Germany . |
| WO 95/12200 | 5/1995 | WIPO . |

Primary Examiner—Tan Dinh
Attorney, Agent, or Firm—Limbach & Limbach L.L.P.

[57] ABSTRACT

A disc-shaped recording medium and a reproducing apparatus for the disc-shaped recording medium in which the letter information, such as a title, pertinent to a program recorded on the disc-shaped recording medium, is recorded as subsidiary data in a management area or in a program area. In the subsidiary data, there is recorded an identified for specifying whether or not the subsidiary data is allowed to be duplicated on an other recording medium so that inhibition or permission of duplication of the subsidiary information may be controlled at the time of duplication of the program.

10 Claims, 17 Drawing Sheets

| FRAME | P | Q | R | S | T | U | V | W |
|---|---|---|---|---|---|---|---|---|
| F01 | | | | S0 | | | | |
| F02 | | | | S1 | | | | |
| F03 | P01 | Q01 | R01 | S01 | T01 | U01 | V01 | W01 |
| F04 | P02 | Q02 | R02 | S02 | T02 | U02 | V02 | W02 |
| ... | ... | ... | ... | ... | ... | ... | ... | ... |
| F95 | P93 | Q93 | R93 | S93 | T93 | U93 | V93 | W93 |
| F96 | P94 | Q94 | R94 | S94 | T94 | U94 | V94 | W94 |
| F97 | P95 | Q95 | R95 | S95 | T95 | U95 | V95 | W95 |
| F98 | P96 | Q96 | R96 | S96 | T96 | U96 | V96 | W96 |

| MSB | | | LSB | |
|---|---|---|---|---|
| 0 | 0 | 0 | 0 | —142a |
| 1 | 0 | 0 | 0 | —142b |
| 0 | 0 | 0 | 1 | —142c |
| 1 | 0 | 0 | 1 | —142d |
| 0 | 1 | 0 | 0 | —142e |

FIG.10

| /16 | /17 | /21 | /22 | /23 | /24 | /25 | /26 | /27 | /28 | /29 | /18 |
|---|---|---|---|---|---|---|---|---|---|---|---|
| CONTROL CTL | ADDRESS ADR | PROGRAM NUMBER 00h | POINT POINT | ELAPSED TIME MINUTE COMPONENT MIN | ELAPSED TIME SECOND COMPONENT SEC | ELAPSED TIME FRAME NUMBER FRM | 0 00h | ABSOLUTE TIME MINUTE COMPONENT PMIN | ABSOLUTE TIME SECOND COMPONENT PSEC | ABSOLUTE TIME FRAME NUMBER PFRM | CRC |

| /16 | /17 | /31 | /32 | /33 | /34 | /35 | /36 | /37 | /38 | /39 | /18 |
|---|---|---|---|---|---|---|---|---|---|---|---|
| CONTROL CTL | ADDRESS ADR | ID1 | ID2 | ID3 t × t0 | ID4 t × t1 | ID5 t × t2 | t × t3 | t × t4 | t × t5 | t × t6 | CRC |

```
00h  SIZE (SIZE)
01h~63h TITLE OF NUMBER (TRACK TITLE)
64h  DISC ID PUBLISHER (DISC ID/PUBILSHER)
65h
66h  GENRE CODE/TEXT (GENRE CODE/TEXT)
67h  DATE/COUNTRY CODE (DATE/COUNTRY CODE)
68h  TITLE OF ALBUM (ALBUM TITLE)         70h (ALBUM TITLE2)    78h (ALBUM TITLE3)
69h  PERFORMER (ARTISTS)                  71h (ARTISTS2)        79h (ARTISTS3)
6Ah                                        72h                   7Ah
6Bh  COMPOSER (COMPOSER)                  73h (COMPOSER2)       7Bh (COMPOSER3)
6Ch  LYRICIST (LYRICIST)                  74h (LYRICIST2)       7Ch (LYRICIST3)
6Dh  ARRANGER (ARRANGER)                  75h (ARRANGER2)       7Dh (ARRANGER3)
6Eh                                        76h                   7Eh
6Fh                                        77h                   7Fh
                                          └──── EXTENSION (EXTENSION) ────┘
```

FIG.13

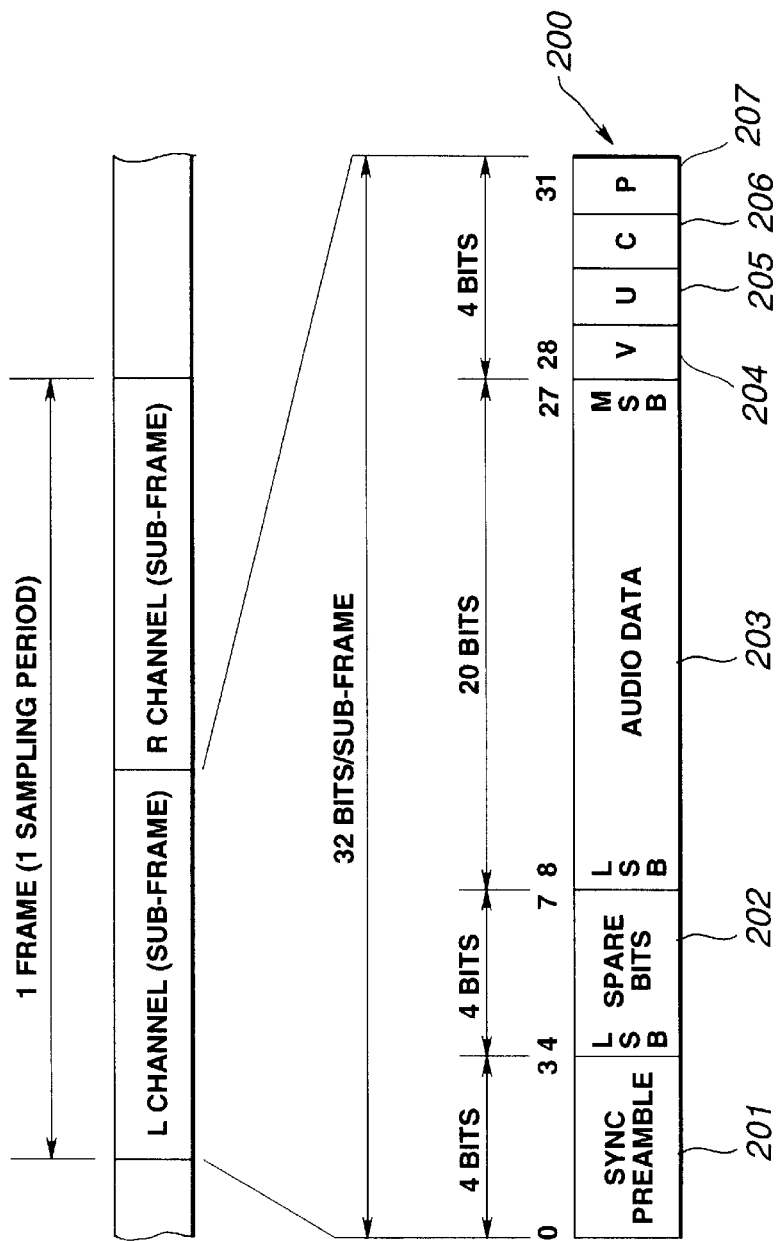

DISC RECORDING MEDIUM HAVING SUBSIDIARY DATA IN WHICH IS STORED AN IDENTIFIER

BACKGROUND OF THE INVENTION

1. Field of the Invention

This invention relates to a disc reproducing apparatus for reproducing a disc-shaped recording medium.

2. Description of the Related Art

In a reproducing apparatus for a compact disc (CD), which is a disc-shaped recording medium having the audio information recorded thereon, various sorts of indication based on the disc reproducing information are used for enhancing convenience in use.

It has been known to reproduce and display the program number, that is called track number, recorded on a Q-channel subcode as later explained as a mode 1, or the elapsed time allocated to each track number, as the display information based on the disc reproducing information in a conventional CD reproducing apparatus.

FIG. 1 shows an example of an optical disc, such as CD.

Referring to FIG. 1, an optical disc 101 has a center aperture 102 and, looking from the inner rim towards the outer rim of the disc 101, includes a lead-in area 103, as a table-of-contents (TOC) area or a program management area, a program area 104 having program data recorded therein, and a program end area or a so-called lead-out area 105. In an audio reproducing optical disc having the audio information recorded therein, audio data is recorded in the program area 104, while the total recording time, the total number of recorded programs and the program-based recording time and so forth, are managed by the lead-in area 103. When the readout of the audio data in the program area 104 by the disc reproducing apparatus has come to a close, and an optical pickup has reached the lead-out area 105, the disc reproducing apparatus completes the reproducing operation for the optical disc designed for audio reproduction.

FIG. 2 shows an example of the above-described disc reproducing apparatus.

The disc reproducing apparatus reads out the audio data of the optical disc 101 designed for audio reproduction with an optical pickup 102 and processes the audio data with a digital signal processing circuit 116 to generate playback data which is outputted at a digital signal output terminal 125 or at left and right channels of an analog signal output terminal, not shown.

The optical pickup 112 of the disc reproducing apparatus reads out the audio data of the optical disc 101, that is the so-called RF signals, and sends the signals to an analog waveform shaping circuit 114, while sending a focusing servo signal to a focusing servo circuit 120 and sending tracking servo signals and thread servo error signals to a tracking servo circuit 121.

The analog waveform shaping circuit 114 shapes the waveform of the RF signals from the pickup 112 and sends the shaped signals to a synchronization detection circuit 115 and a clock generating circuit 117. The clock generating circuit 117 generates reproducing clocks for the RF signals based on the RF signals from the analog waveform shaping circuit 114. The generated reproducing clocks are sent to the synchronization detection circuit 115, digital signal processing circuit 116 and to a rotation servo circuit 122. The synchronization detection circuit 115 detects a frame synchronization pattern from the RF signals and sends the signal, from which frame synchronization pattern has been detected, to the digital signal processing circuit 116.

The digital signal processing circuit 116 decodes the RF signals, from which the frame synchronization pattern from the digital signal processing circuit 116 has been detected, based on the reproducing clocks from the clock generating circuit 117 and reference clocks sent from the quartz oscillator 119, and sends the decoded signals to a subcoding detection circuit 118, a D/A conversion circuit 123 and to a digital signal output terminal 125. The D/A conversion circuit 123 converts the digital signals into analog signals which are sent to an audio amplifier 124. The audio amplifier 124 amplifies the analog audio signal from the D/A conversion circuit 123 and send the amplified signal to the right and left channels of the analog signal output.

The subcoding detection circuit 118 detects data of subcode P and Q channels, as later explained, and sends the data of the respective channels to the tracking and thread servo circuit 121.

The subcoding detection circuit 118 detects data of the subcode P and Q channels from the digital signal of the digital signal processing circuit 116 and sends the data of the respective channels to a tracking and thread servo circuit 121.

The focusing servo circuit 120 generates a focusing operation driving signal, based on the focusing error signal from the optical pickup 112, and sends the focusing operation driving signal to the pickup 112 for controlling the focusing operation of the optical pickup 112. The rotation servo circuit 122 generates a rotation driving control signal, based on playback clocks from the clock generating circuit 117 and the reference clocks from the quartz oscillator 119, and sends the rotation driving control signal to the spindle motor 113 for controlling the rotational operation of the spindle motor 112.

The tracking and thread servo circuit 121 generates tracking control driving signals based on the tracking servo error signals and the thread servo error signals from the pickup 112 and sends the generated tracking control driving signals to the pickup 112 for controlling the tracking operation of the pickup 112. The tracking and thread servo circuit 121 generates track position control signals based on data from the P and Q channels supplied from the subcoding detection circuit 118 and sends the position control signals to the pickup 112 for controlling the track positions of the pickup 112 for the programming mode.

The data of the subcode and the P and Q channels as described above are now explained.

The signals recorded on the optical disc designed for audio reproduction are sampled with the sampling frequency of 44.1 kHz, with each sample or word being of 16 bits. The 16-bit-per-word sampled data is split into a symbol of upper 8 bits and another symbol of lower 8 bits and error correction coded or scrambled on the symbol basis so that every 24 symbols of the data make up a frame. This corresponds to 12 original samples, that is 6 samples each of the stereo left and stereo right channels.

The signals assembled into one such frame are of such a format in which each frame 135 has a synchronization pattern data area 131 of 24 channel bits, a subcoding area 132 of 14 channel bits, a program data area 133, a parity data area 134, another program data area 133 and another parity data area 134. The program data area 133 is made up of 12 symbols D1 to D12 each being of 14 channel bits, while the parity data area 134 is made up of parity data P1 to P4 each being of 14 channel bits. The areas or data portions are interconnected by junction areas each being of 3 channel bits. Thus, each frame 135 is made up of a sum total of 588 channel bits of data.

FIG. 4 shows 98 of the above frames 135 collected together and re-arrayed so that the above areas and data portions of each frame will be contiguous to one another in the vertical direction. The set of data shown in FIG. 4 in its entirety is also termed a frame. However, for distinction from the frame made up of 588 channel bits, the set of data of FIG. 4 in its entirety, made up of 98 frames, is termed a subcoding frame. This subcoding frame is made up of a frame synchronization pattern portion 136, a subcoding portion 137 and a data/parity portion 138. The subcoding frame is equivalent to 1/75 second of the usual CD reproducing time.

The subcoding data, inclusive of the P-channel data and the Q-channel data sent from the subcoding detection circuit 118 of FIG. 12, is recorded on the subcoding portion 137 of FIG. 4. The subcoding portion 137 is of a structure such that 98 frames of from frame F0 to frame F98 make up one block, that is the above subcoding frame, as shown in FIG. 15. The frames F01 and F02 are block synchronization patterns, while representing out-of-rule patterns S0 and S1 of the eight-to-fourteen modulation (EFM) system. The subcoding detection circuit 118 detects the above synchronization patterns to form a one block of the subcoding portion 137. The respective bits of the that frames form frame F01 to frame F98 make up channels of from channel P to channel W. For example, the P-channel is constituted by portions of the patterns S0 and S i and P01 to P98.

The data of the six channels of from channel R to channel W are used for special uses, such as still pictures or representation of karaoke letters. The data of the P-channel and the Q-channel are used for controlling the pickup track position control, that is for controlling the accessing operation for the pickup.

The P-channel is used exclusively for recording a signal æ0' in the lead-in area 103, a signal æ1' and a signal æ0' between the music and music and otherwise in the program area 104, respectively, and a signal repeated between æ0' and æ1' at a pre-set period in the lead-out area 105. The P-channel information is used as the information for locating the program leading end portion.

The Q-channel information is used as the address information used by the pickup 112 of FIG. 2 to perform the above accessing operation. Each block of the Q-channel, that is each subcoding frame, has a structure made up of a synchronization bit block 141, a control bit block 142, an address bit block 143, a data bit block 144 and a cyclic redundancy code (CRC) bit block 145, as shown in FIG. 6.

The synchronization bit block 141 is made up of 2-bit data for recording a portion of the synchronization pattern. The control bit block 142 includes 4-bit data for recording the number of audio channels, emphasis or data used for identifying digital data. The 4-bit control bit data in the control bit block 142, that is the control bit data, is now explained. FIG. 7 shows the 4-bit control bit data. In the control bit data 142a, "0000" denotes 2-channel audio without pre-emphasis. In the control bit data 142b, "1000" denotes 4-channel audio without pre-emphasis. In the control bit data 142c, "0001" denotes 2-channel audio with pre-emphasis. In the control bit data 142d, "1001" denotes 4-channel audio data with pre-emphasis. In the control bit data 142e, "0100" denotes a data track other than an audio track in a data read-only optical disc, such as a CD-ROM.

In FIG. 6, the address bit block 143 has 4-bit data for recording a control signal specifying the format or a sort of data in the data bit block 144.

In FIG. 6, the data bit block 144 has 72-bit data. If, for example, the address bit is "0001", the data bit block 144 is made up of a program number portion 151, an index portion 152, an elapsed time minute component portion 153, an elapsed time second component portion 154, an elapsed time frame number portion 155, a 0-portion 156, an absolute time minute component portion 157, an absolute time second component portion 158 and an absolute time frame number portion 159, as shown in FIG. 8. Each portion is comprised of 8-bit data. Meanwhile, a frame of the frame number recorded in the elapsed time frame number portion 155 and in the absolute time frame number portion 159 denotes the subcoding frame.

The program number portion is represented by two digits in the binary coded decimal notation. For example, "00" denotes a at a beginning portion of data readout, that is a so-called lead-in track, while "01" to "99" denote the program numbers. The number in the hexadecimal notation "AA" denote data read-out end, that is a so-called lead-out track. In the following description, a suffix "h" is appended to a number represented in hexadecimal notation such as, for example, "AAh".

The index portion 152 is represented by two-digit BCD. For example, "00" denotes transient stop, that is pause, while "01" to "99" denote finer divisions of the program unit.

The elapsed time hour component portion 153, the elapsed time second component portion 154 and the elapsed time frame number portion 155 denote the elapsed time in the track each by two digits, that is a sum total of 6 digits. Since one second is 75 frames, the elapsed time frame portion 155 is represented by "00" to "74". The elapsed time frame number is decremented between tracks so that the number will start from zero at the initial position of each track. The 0-portion 156 is stuffed with "0"s.

The absolute time hour component portion 157, absolute time second component portion 158 and the absolute time frame number portion 159 are each represented by 2-digit BCD, totaling at 6-digit BCD. In the lead-in area 103 of FIG. 1, if the index portion 152 is "A0h", the absolute time component portion 157 is represented by the first program number, whereas, if the index portion 152 is "A1h" "A1h", the absolute hour component portion 157 is represented by the last program number. Both in case the index portion 152 is "A0h" and in case the index portion 152 is "A1h", the absolute time second component portion 158 and the absolute time frame number portion 159 are both "0". If the index part 152 is "A2h", the absolute time with which the lead-out area 105 of FIG. 1 starts is recorded in the absolute time minute component portion 157, absolute time second component portion 158 and in the absolute time frame number portion 159.

In the program area 104 of FIG. 1, the time which advances in an additive sense each time 0 comes from the start position of pause of the first program, that is the absolute time, is recorded in the absolute time minute component portion 157, absolute time second component portion 158 and in the absolute time frame number portion 159.

The CRC bit block 145 of FIG. 16 is a portion having 16-bit data. In the CRC bit block 145 is recorded data for error detection of the CRC.

The programming mode is realized by detecting the information employing data of the Q-channel data as described above by the subcoding detection circuit 118 of the disc reproducing apparatus as shown in FIG. 2, decoding the information and by controlling the accessing operation of the pickup 121 by the tracking and thread servo circuit 121 based on the decoded signal.

Since the number of programs and the time information concerning the individual programs are recorded in the subcode Q-channel, this information may be displayed on a display device, such as LCD, the serial number of the currently played program in the sequence of the program numbers of the audio reproducing optical disc, the elapsed play time or the absolute time from the beginning can be checked visually.

Meanwhile, the text information, recorded in the subcode, is necessarily digitally outputted during readout of the TOC information. If rights are accrued in the text information, the information may be illicitly duplicated, since there lacks means for controlling the digital outputting of the text information, thus raising troubles in connection with such rights.

SUMMARY OF THE INVENTION

It is therefore an object of the present invention to provide a disc reproducing apparatus in which at least a digital output of the text information can be interrupted for a pre-set time.

The present invention provides a disc reproducing apparatus in which main data, management data for managing the main data and subsidiary data ancillary to the main data are digitally outputted from a disc-shaped recording medium having the main data, management data and the subsidiary data recorded thereon. The disc reproducing apparatus includes readout means for reading out the main data, management data and the subsidiary data from the disc-shaped recording medium, detection means for detecting a flag specifying inhibition of permission of digitally outputting the subsidiary data from the subsidiary data read out by the read-out means, and control means for inhibiting or permitting the outputting of the subsidiary data from the digital output terminal based on the flag detected by the detection means.

The present invention also provides a disc-shaped recording medium including main data, management data for managing the main data and subsidiary data ancillary to the main data, wherein an identifier inhibiting or permitting duplication of the subsidiary data is included in the subsidiary data.

With the disc reproducing apparatus according to the present invention, if, when reproducing the disc-shaped recording medium having main data and the subsidiary data recorded thereon, the specified information, such as text data, is recorded as the subsidiary data, and a specified flag pertinent to the specified information, such as a copying inhibiting flag, is set in making the recording, it becomes possible to selectively invalidate only the subsidiary data in transmitting the main data and the subsidiary data, such that, if rights have been accrued to the specified information, it becomes possible to inhibit illicit copying of the specified information.

BRIEF DESCRIPTION OF THE DRAWINGS

FIG. 5 shows a data structure of the entire channels of the subcode signal.

FIG. 10 shows an illustrative arraying example of the Q-channel in a subcode of the disc-shaped recording medium according to the present invention.

FIG. 11A shows another illustrative arraying example of the Q-channel in a subcode of the disc-shaped recording medium according to the present invention.

FIG. 11B shows another illustrative arraying example of the Q-channel in a subcode of the disc-shaped recording medium according to the present invention.

FIG. 13 shows an illustrative example of an identifier of an ID1 of an item of the second management area.

FIG. 15A shows the transmission format of a digital interface.

FIG. 15B shows the channel-based transmission format of the digital interface according to the present invention.

DESCRIPTION OF THE PREFERRED EMBODIMENTS

Figure 1:
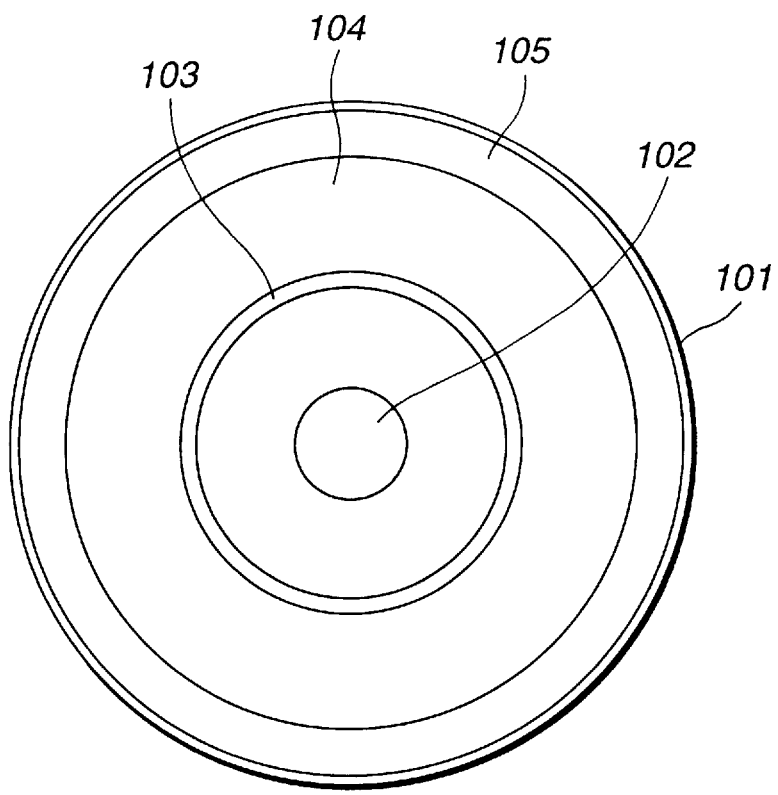
FIG. 1 is a perspective view showing a conventional disc-shaped recording medium.
Figure 2:
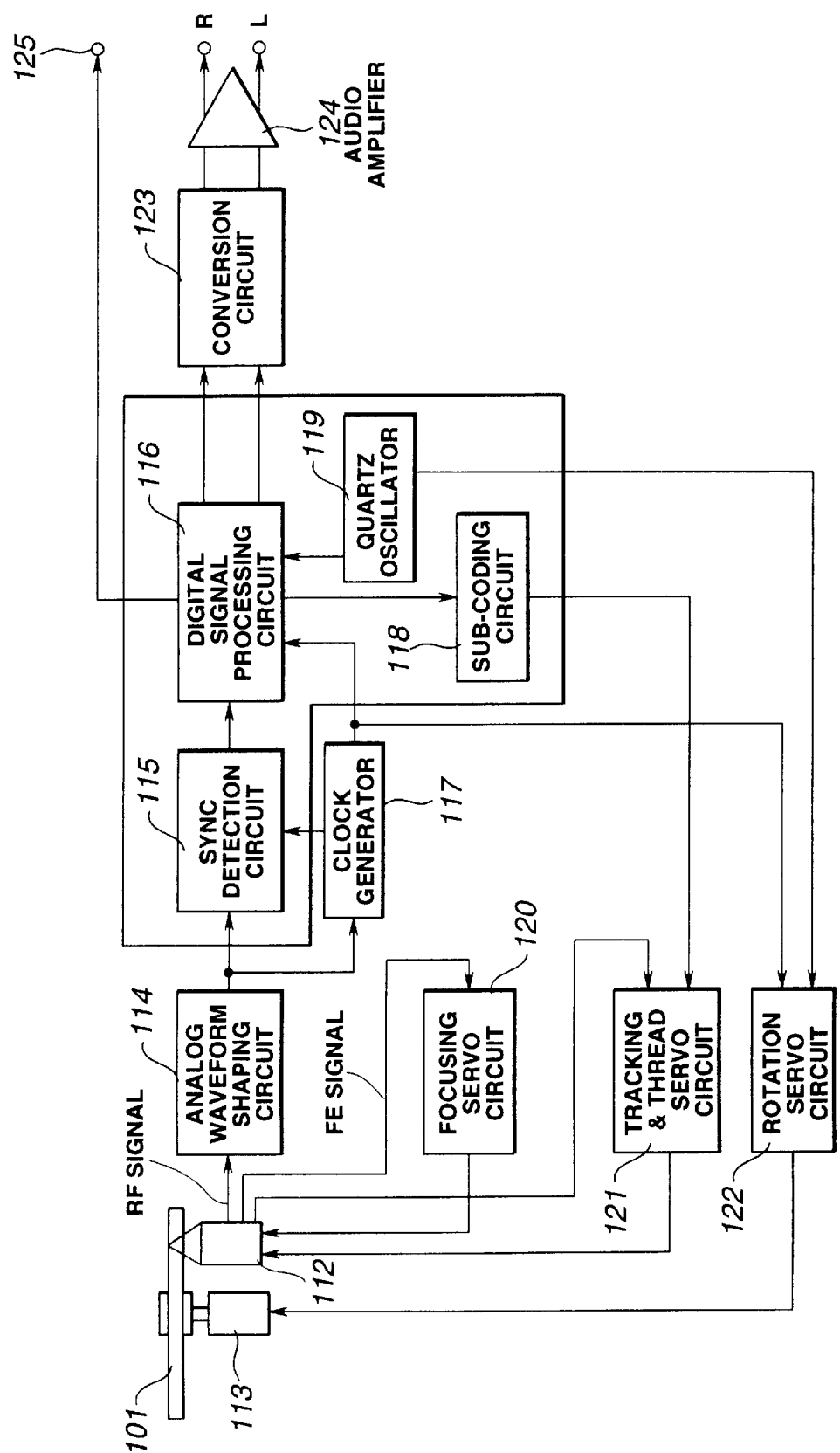
FIG. 2 is a block diagram showing a conventional disc reproducing apparatus.
Figure 3:
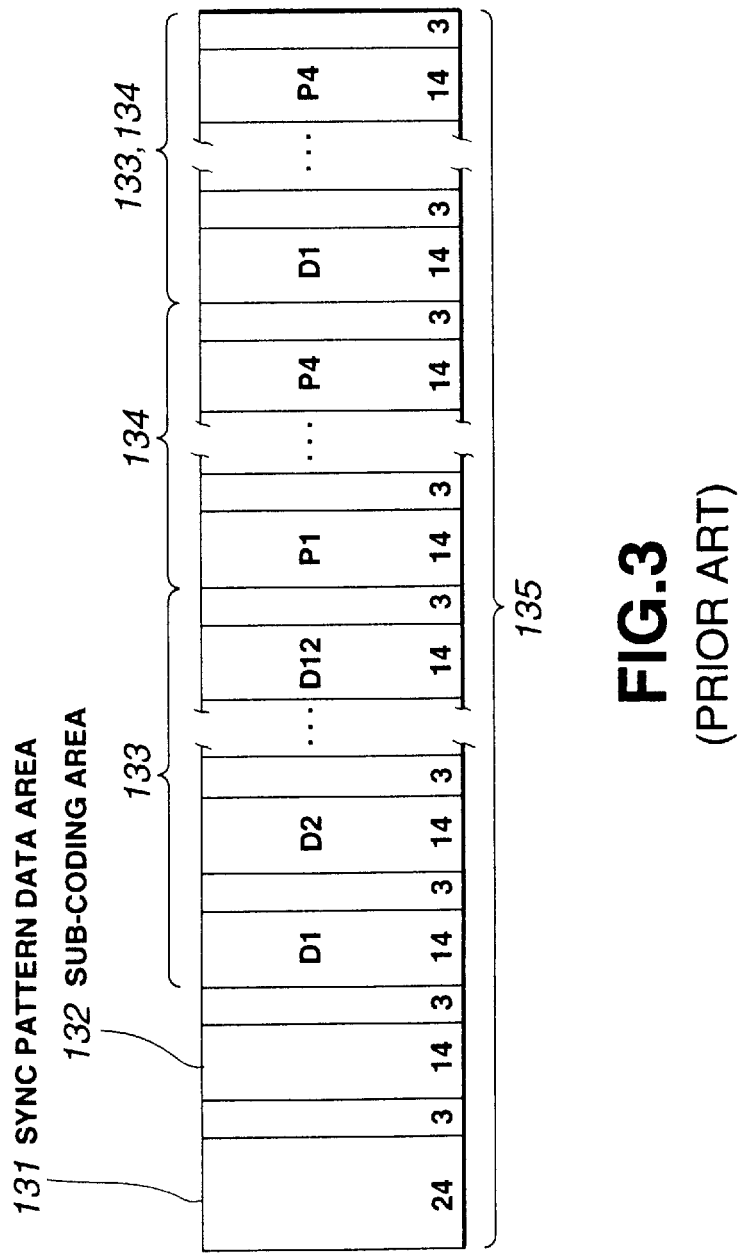
FIG. 3 shows a data structure of a frame as a recording unit of the disc-shaped recording medium shown in FIG. 1.

Referring to the drawings, preferred embodiments of the disc reproducing apparatus according to the present invention will be explained in detail.

The disc reproducing apparatus is such an apparatus designed for reproducing an optical disc 1, having recorded thereon main data and subsidiary data appended to the main data, for digitally outputting the main and subsidiary data. The disc reproducing apparatus includes a control circuit 4 and an interruption switch 7 responsive to a detection output of the control circuit 4 to obstruct a digital output for transmission. The control circuit 4 is designed so that, if there is the specified information in at least a portion of the subsidiary data, and also if there is a specified flag pertinent to the specified information, the control circuit can detect such flag.

Figure 9:
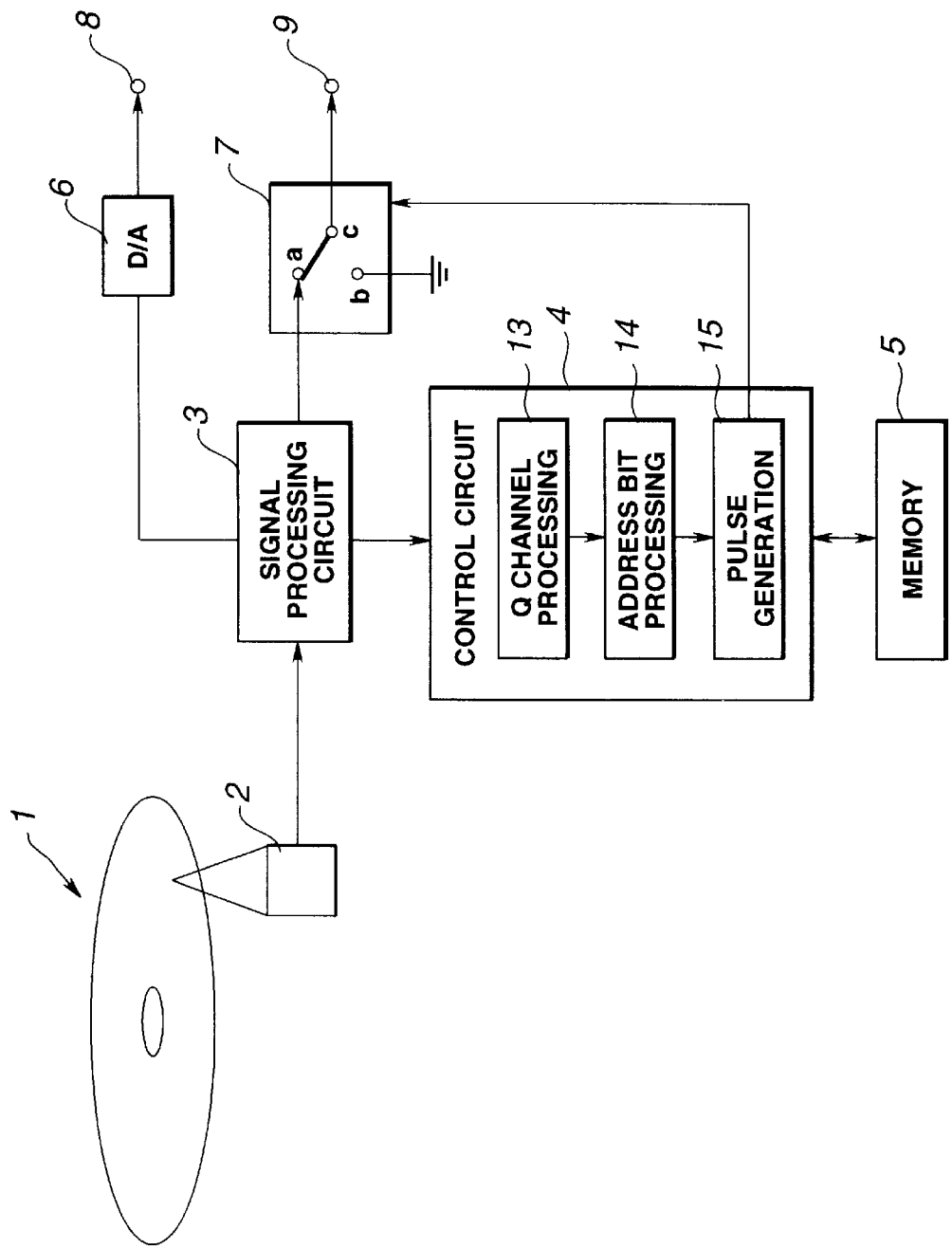
FIG. 9 s a block diagram showing a disc reproducing apparatus according to the present invention.

Before proceeding to the description of the operation of the disc reproducing apparatus, data recorded on the optical disc 1 of FIG. 9 is explained.

The optical disc 1 has recorded thereon a program made up of audio data as main data, and at least one of the type of the disc-shaped recording medium, name of a performer, name of a composer, a name of a lyricist, name of an arranger, program title, identification number of the disc-shaped recording medium, genre of the musical number, publisher and the date of production, as the above-mentioned specified information recorded in at least a portion of the subsidiary data annexed to each program.

Figure 10:
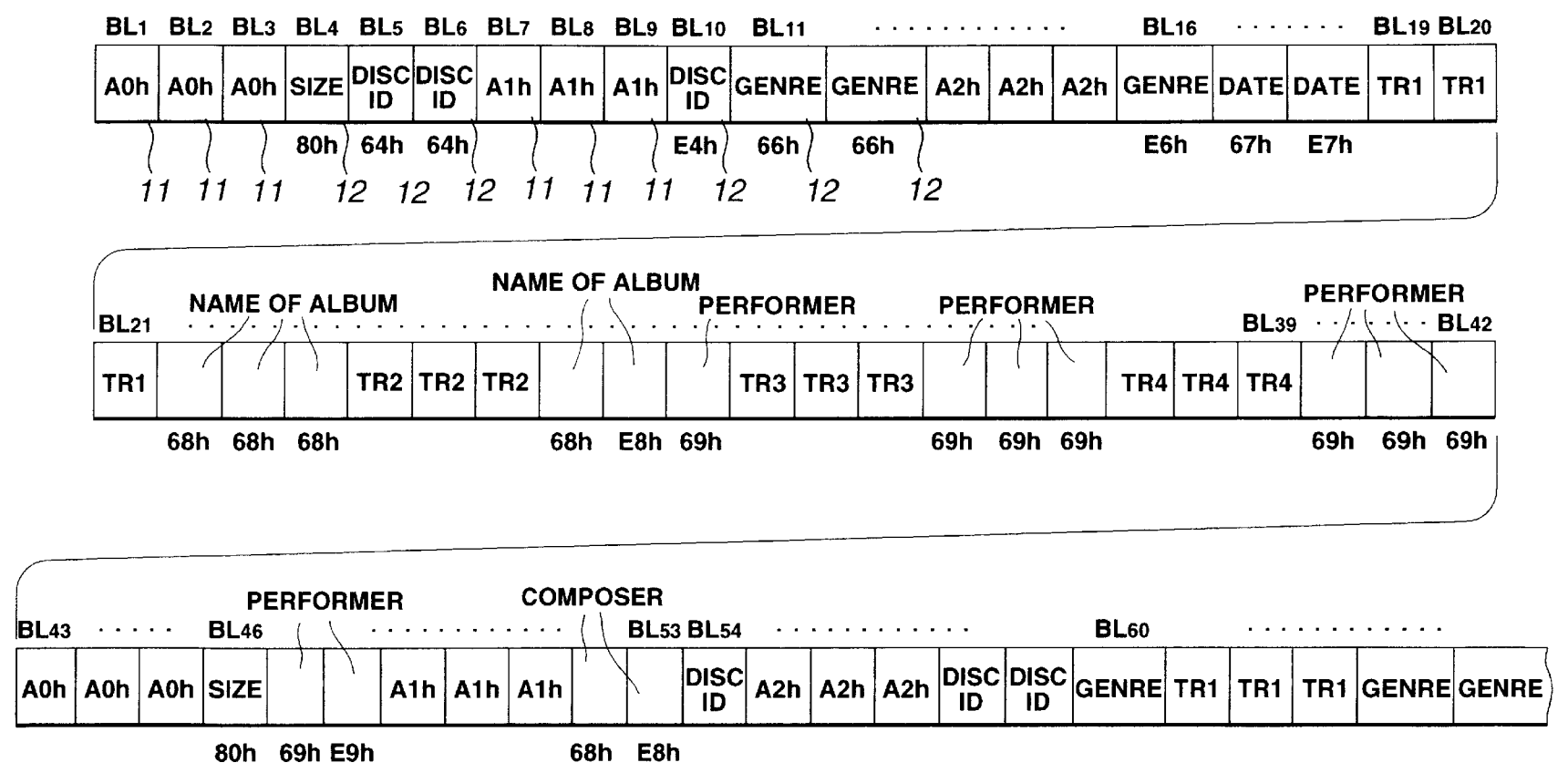

FIG. 10 shows an illustrative arraying example of the subcode channel information in the lead-in area 103 which is an area designed for writing the table-of-contents (TOC) information as the management information for the optical disc 1.

FIGS. 11A and 11B show the format for a main portion of one block of the subcode Q-channel in the lead-in area, that is the one subcoding frame.

Referring to FIG. 10, the first management information 11, as the conventional TOC information, is recorded in triplicates across three blocks, while the second management information 12, inclusive of letter data concerning the program, is recorded in terms of three blocks as a unit, next to the triplicate blocks of the first management information. That is, one block of the first management information 11, recorded in triplicates across three blocks, is followed by the second management information 12 recorded across three blocks, this recording pattern of the first management information and the second management information being repeated alternately.

Figure 16:
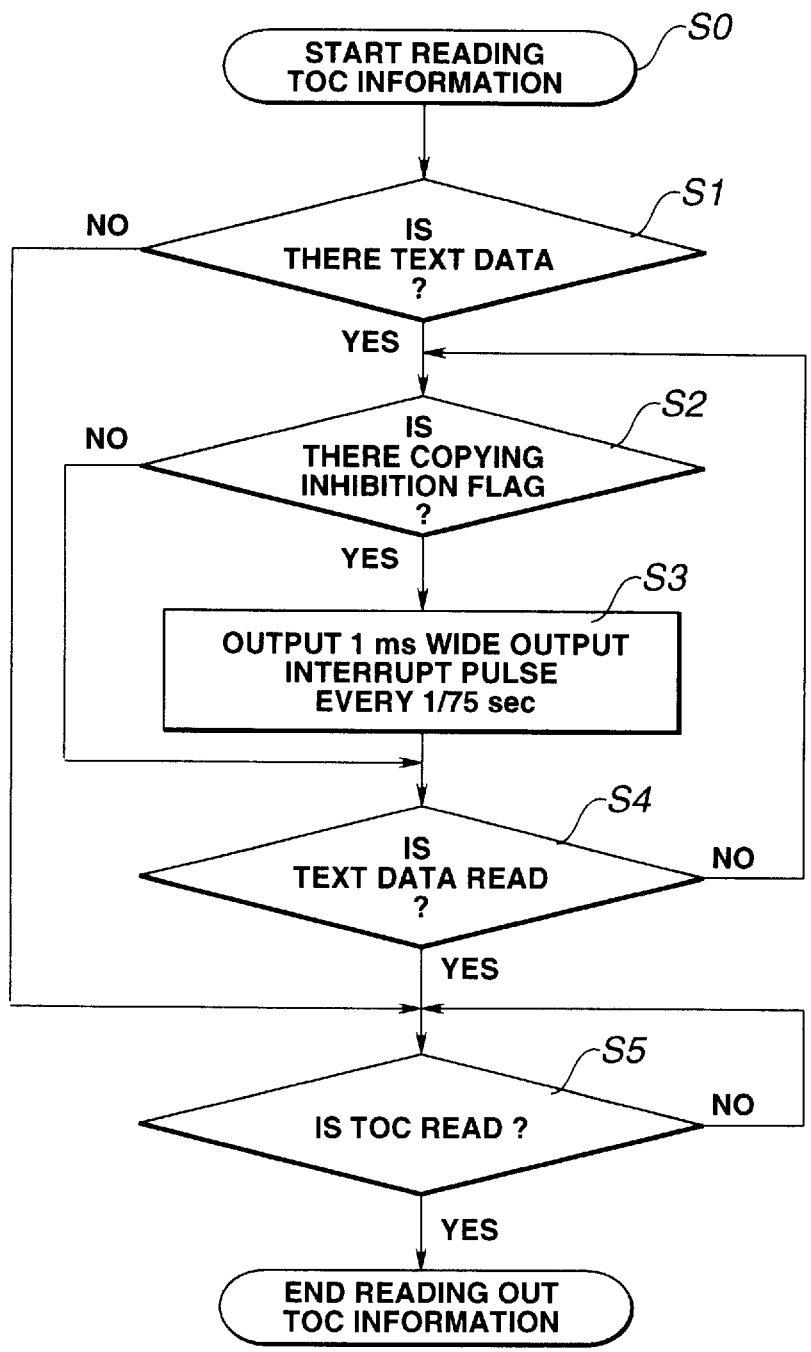
FIG. 16 s a flowchart for inhibiting a digital output according to the present invention.

FIG. 11A shows the format for 96 bits corresponding to the one block of the first management information 11, that is the subcoding frame, less the synchronization bit block 141 of FIG. 16.

Figures 6, 7:
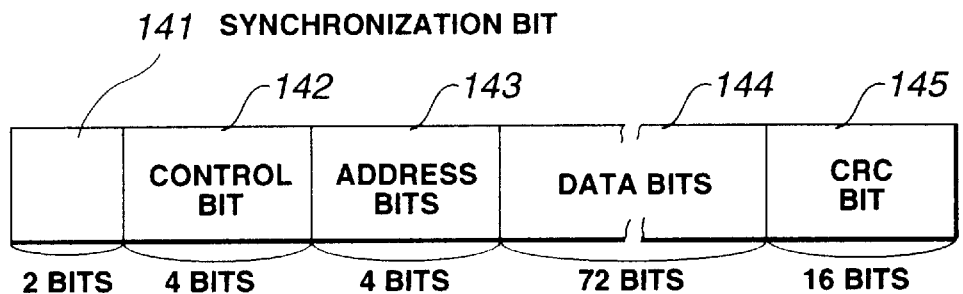
FIG. 6 shows a data structure of the Q-channels in the subcode.
FIG. 7 shows a control bit data included in the Q-channel.

In FIG. 11A, the control bit area 16 and the address area 17 correspond to the control bit block 141 and the address bit block 142 of FIG. 6, respectively, while the CRC area 18 of FIG. 11A corresponds to the CRC bit block 145 of FIG. 6.

Figure 8:
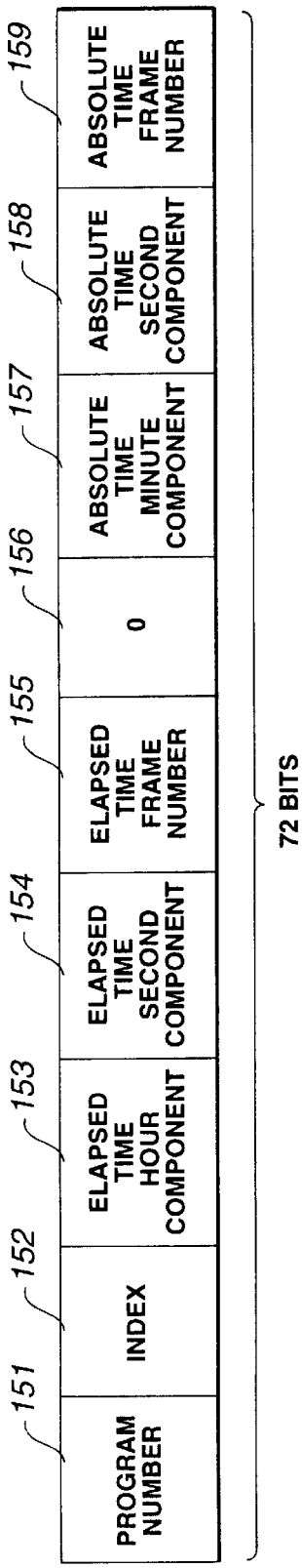
FIG. 8 shows a data structure of data bits in the conventional channel.

In FIG. 11A, areas 21 to 29 correspond to the data bit block 144 of FIG. 16, and are equivalent to the areas 151 to 159 of FIG. 8. As the TOC information of the lead-in area, the track number of the area 21 is fixed at "00h", while the index area 152 of FIG. 8 is the point area 22 and the figures of the areas 23 to 25 of the elapsed time minute component, elapsed time second component and the elapsed time frame component are all fixed at "00h".

Specifically, the first management information 11 in the lead-in area specify, similarly to the conventional TOC information, the number of programs recorded in the CD recording area, the total recording time and the addresses corresponding to the recorded programs. If the contents POINT of the point area 22 is "A0h" in hexadecimal notation, the contents PMIN of the absolute time minute area 27 specify the first program number. Similarly, if the contents POINT of the area 22 is "A1h", the contents PMIN of the minute component area 27 specify the last program and, if the contents POINT of the area 22 is "A2h", the contents PMIN, PSEC and PFRM of the areas 27 to 29 for the minute component, second component and the frame component of the absolute time specify the absolute time at which begins the lead-out. If the contents POINT of the point area 22 are a 2-digit value of "00" to "99" in binary coded decimal (BCD) representation, the contents PMIN, PSEC and PFRM of the areas 27, 28 and 29 of the minute, second and frame components of the absolute time denote the address at which begins the program represented by the numerical figure in absolute time. The address ADR of the address area 17 in the first management information 11 in such lead-in area is "1".

FIG. 11B shows the format for 96 bits corresponding to one block of the second management information in the lead-in area, that is the sub-coding block, less the synchronization bit block 141 of FIG. 6. In the second management information, the contents ADR of the address area 17 is set to "6" and the information inclusive of the letter data pertinent to the above program is recorded therein. Therefore, in the lead-in area, the first management information 11 and the second management information 12 can be distinguished from each other depending on the contents ADR of the address area 17.

In FIG. 11B, the item codes, letter codes and the serial numbers of the contents of the letter information are recorded as the binary code information ID1, ID2 in the areas 31 and 32, respectively. In the next following areas 33 to 35 are recorded the binary code information data ID3, ID4, ID5 or the text information data txt0, txrt1 and txt2 representing letter data, depending on the items. In the next following areas 36 to 39 are recorded text information data txt3 to txt6, respectively.

By reading out the second management information in the lead-in area, having alternately arrayed three blocks of the first management information 11 and the second management information 12 recorded therein as shown in FIG. 10, the program recorded on the recording medium, for example, letter data for an audio program, can be read out and displayed as desired.

Since the letter information, such as the program name, is recorded in the lead-in area, it can be read out directly after insertion of the disc, thus conveniently reducing the waiting time for the user and reducing the time of quality control during disc production. By recording the letter information, such as the disc title, album name, disc ID or the performer, the letter information can be utilized in musical number selection for a car-laden disc changer, a disc changer for household user or FM multiplied text broadcast.

In a conventional usual CD, containing 14 musical numbers, as an example, the time information is recorded nearly 700 times as the TOC information for the inner lead-in area. This number of repetitive recording can be halved in the present embodiment, and the redundant portion is used for recording letter data.

Thus, there is no necessity of developing new LSIs (large rescale integrated circuits), such that the letter information can be read out solely by changing a portion of the software program for displaying the playback time. There is no adverse effect on the main recording portions, such as the subcode R to W channels other than the subcode area in the lead-in area, while future extension possibility is also assured.

Moreover, with the conventional disc reproducing apparatus having the text display function, the letter information of the present embodiment can be displayed without increasing the cost.

By way of illustrative examples of the standards of the letter information of the present embodiment, the recording contents include the album name, performers, disc IDs, such as the disc production number, genre specifying the sort or the field of the program, the size of the subsidiary information specifying the size of the subsidiary letter information and the publisher. The recording contents may also optionally include the program name, composers, lyricists, arrangers, date of production, other 1 and other 2. The total number of the items of the recording contents thus is equal to 13. The number of the letter sorts are four. The letter sort can be managed by the country codes. The number of letters is 224 bytes at the maximum per item and may be optionally enhanced to 672 at the maximum. The letter reading rate is 262 bytes per second. In addition, the binary code on information data ID1 to ID5 of the areas 31 to 35 can be used for expansion, such that reproduction control or multilingual reproduction is also feasible.

The respective items of the recording contents are further explained in detail.

Figures 12A, 12B:
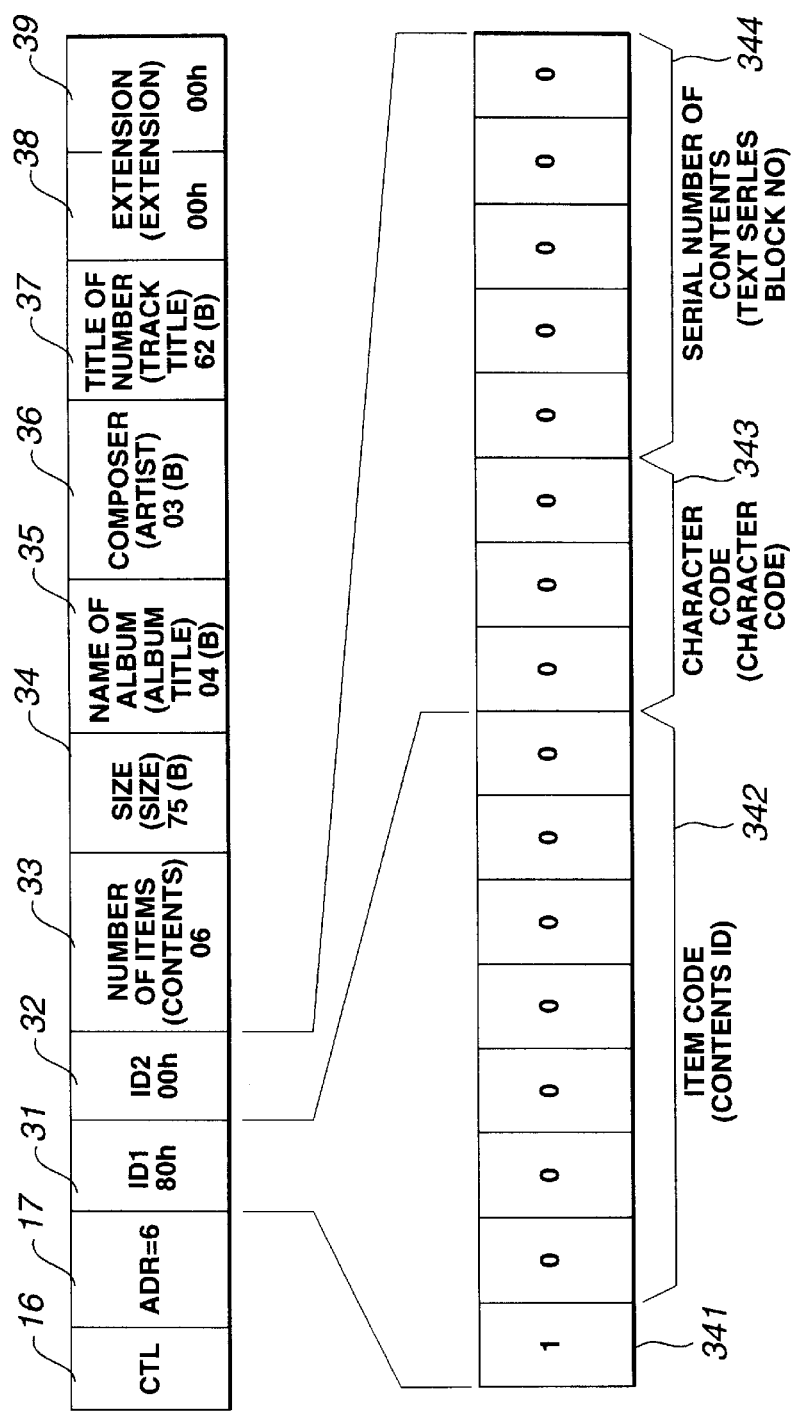
FIG. 12A shows an illustrative arraying example in case an item of a second management area of the disc-shaped recording medium according to the present invention represents the size.
FIG. 12B shows a format of ID1 and ID2 when the item of the second management area of the disc-shaped recording medium according to the present invention represents the size.

FIGS. 12A and 12B illustrate one block for the case in which the above item is "size". In these figures, areas 31 to 39 correspond to the areas 31 to 39 of FIGS. 11A and 11B.

In FIG. 12A, an MSB 341 of the binary code information ID1 of the area 31 is used as the last text block flag. The MSB 341 equal to "1" represents the last block of a series of blocks of an item. Since the item of the "size" of FIG. 12A is constituted by one block, this block is the last block, with the MSB 341 being "1". The next following 7 bits (7-bit portion 342) are used as an item code (contents ID) for identifying the respective items, and is set as shown for example in FIG. 13.

That is, FIG. 13 shows the value of the contents of the 7-bit portion 342 of the binary code information ID1 of FIG. 12A in hexadecimal notation and the corresponding item. This item is "size" if the contents of the 7-bit portion 342 are "00h". If the contents of the 7-bit portion 342 are "01h to 63h", that is 1 to 99 in decimal notation, the 7-bit portion specifies the item "program" corresponding to the program number. Similarly, the contents of the 7-bit portion "64h", 66h", 67h", 68h", 69h", 6Bh", 6Ch"and 6Dh" denote the disc ID publisher, genre code/test, date (date of production)/country code, album name, performer, composer, lyricist and arranger, respectively. The contents of the 7-bit portion "70h to 7Fh" are used for expanding the number of contiguous blocks of an item. If a block in subject is the last block of a series of contiguous blocks in an item, the MSB 341 of the binary code information ID1 of FIG. 12A becomes "1", so that, if x is an arbitrary one-digit hexadecimal number (x=0h to Fh), the 8-bit binary code information ID 1 of "6xh" and "7xh"become "Exh" and "Fxh", respectively.

Returning to FIG. 12A, if the item is "size", the item is completed in one block, so that the binary code information ID 1 of the area 31 is "80h". In the next area 32, an upper 3-bit portion 343 and a lower 5-bit portion 344 are used as the letter code and as the serial number of the contents, respectively. As for the letter codes of 3-bit portion 343, the letter code "000", "001", "010", "011" denote an ASCII code, an European letter code inclusive of special letters, a katakana JIS code and a shift JIS 2-byte code, respectively. The letter code "1xx" specifies that a letter corresponding to the country code for the item code "67h " is used. Therefore, since the text data in one block is 7 bytes, 32 blocks at the maximum can record letters of 224 (=7×32) bytes.

The next area in FIG. 12A specifies the number of items, which s "06" that is 6, in the present case. Although the number of items does not include the item "program", it is possible to include the "program" item. The areas 34 t o37 specify the number of blocks used for items "size", "album name", "performer" and "program", respectively. In the embodiment of FIG. 12A, the areas denote "75", "04", "03" and "62", respectively. The "size" of the area 34 denotes the number of blocks of the entire item and includes items of "disc ID/publisher", "genre code/text", and "date/country code", so that it is larger than the sum of the number of blocks of the items "album name", performers and æ program".

The next two areas 38, 39 denote the state of expansion. The 8 bits of each byte are associated with the state of expansion of the eight items and "1" is set if the state is the expanded state. That is, if, for items having the item codes of the 7-bit portion 342 of the binary code information ID1 of the area 31 of "68h to 6Fh", it is desired to record the text beyond the range of 32 blocks per item at the maximum, represented by the serial number of the contents of the 5-bit portion 344, expansion of further 32 bocks becomes possible by setting the item code of the 7-bit portion 342 to "70h to 77h". For example, if it is desired to expand the name of album of the item code of "68h" to 32 block or more, the item code is set to "70h" as from the 33rd block and 32 blocks are annexed contiguously for enabling 64 blocks at the maximum to be used. If it is desired to record the text in a range exceeding 64 blocks, the item code of the 7-bit portion 342 is set to "78h to 7Fh" for enabling the text to be recorded for further 32 blocks up to the maximum of 96 blocks. At this time, "1"is set at an associated bit of the 8 bits of the area 39. By performing the expansion twice in this manner, it becomes possible to record letters of up to 96 blocks, that is 672 bytes at the maximum, since each block is made up of 7 bytes. If both the areas 38 and 39 are "00h", no expansion has been made.

Figures 14A, 14B:
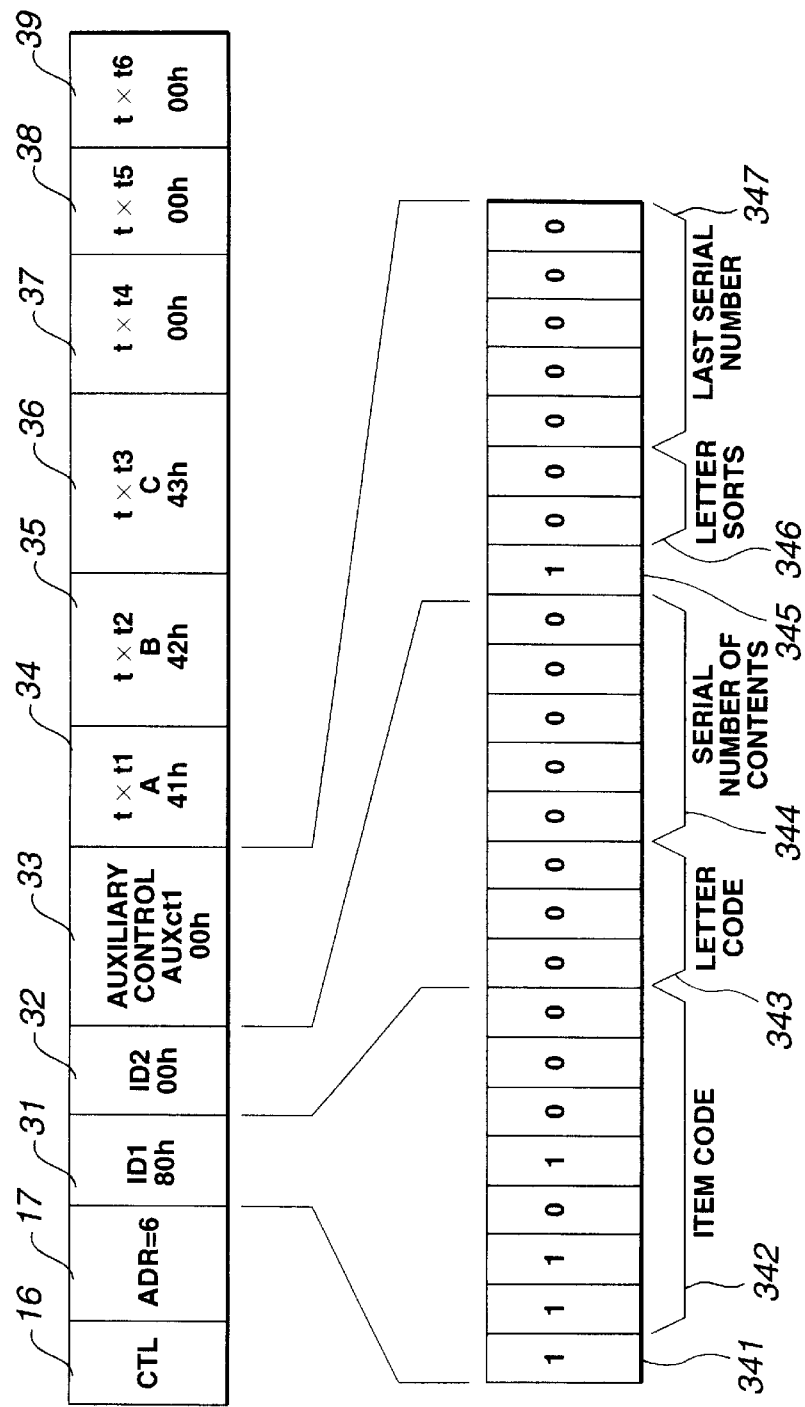
FIG. 14A shows an illustrative arraying example in case an item of the second management area of the disc-shaped recording medium according to the present invention represents the album.
FIG. 14B shows a format of ID1 and ID2 and an auxiliary control code when the item of the second management area of the disc-shaped recording medium according to the present invention represents the album.

Referring to FIGS. 14A and 14B, an recording example of the letter information of the item "album name" is explained. The same applies for other items of "disc ID/publisher", "genre code/text", "date/country code", performer", "composer", "lyricist", and æarranger".

Figure 4:
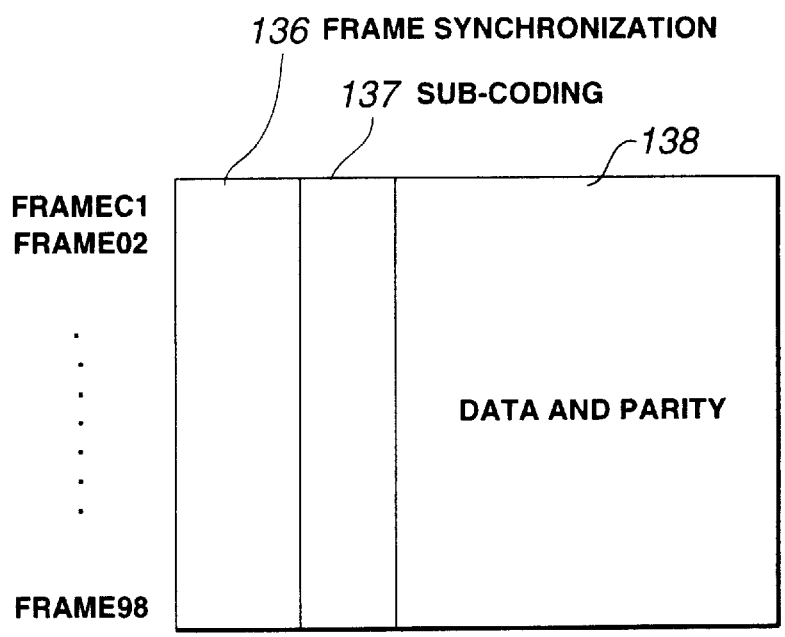
FIG. 4 shows a data structure of an entire subcoding frame formed by blocking a pre-set number of frames.

In the embodiment of FIG. 14A, since the item code of the 7-bit portion 342 of the binary code information ID1 of the area 31 is the "album name" of "68h" and is completed with one block, the last text block flag of the MSB 341 is "1", with the 8 bits of the binary code information ID1 being "E8h". As for the contents of the binary code information ID2 of the area 32, the letter code of the bit portion 343 is the ASCII code of "000", while the serial number of the contents of the 5-bit portion 344 is "00000", as in the embodiment of FIG. 4.

The next area 33 ff. are allocated as a principle to text letters. In an initial block of an item, only the area 33 is a subsidiary control area. Of the 8 bits , an MSB 345 is a copying inhibition flag, the next following two-bit portion 346 is letter sorts and the lower 5-bit portion 347 is ultimate serial numbers.

The copying inhibition flag of the MSB 345 of "1" and "0" denote copying inhibition and copying permission for the text letters, respectively. Since the flag is "1" in FIG. 14B, copying of the text letter is inhibited.

The next following 2-bit portion 346 denotes the number of sorts of letters used in this item. The number of sorts that is denoted by "00" and "11" denote one sort and up to four sorts, respectively. For different blocks, plural sorts, more precisely, up to four sorts, of the letter codes in a string of letters are allowed. The letter codes of each block are specified by the 3-bit portion 343 in the binary code information ID2. This renders it possible to reduce the total number of blocks in case the Chinese characters and alphabetical letters co-exist. The ultimate serial numbers of the lower 5-bit portion 347 denotes the serial number of the contents of the last block of contiguous blocks making up a string of letters. In the present embodiment, the serial number is 0 because the item is completed in one block. The next area 34 ff. is used for text letters. In the embodiment of FIG. 14A, the string of letters "ABC" is stated. The area of the remaining bytes in the block is stuffed with the so-called null-codes "00h".

As for the items of the "disc ID/publisher", "genre code/text" and "date/country code" having the item codes of "64h", "66h Æand "67h", it is provided that these be completed within three blocks, that is within 21 bytes. As for the item of "genre code/text" of "66h", the genre is prescribed in association with a 1-byte code, such that the genre codes for the genre of "05h" and "17h" are set to, for example, classics and rock music, respectively. If genre classification for the pre-set codes is insufficient, 20 bytes of the letter text and "," may be appended in continuation to the 1-byte code. As for the "date/country code" of "67h", it is represented by four digits of the years of A.D. (Y), 2-digit month (M), 2-digit day (D) and the country code with roughly two letters. As for the country code, the United States, Japan and Netherlands are denoted with US, JP and NL, pursuant to the International Standard Organization (ISO), respectively. The date is usually represented by the date of production. If the date is not known, "mmdd" is entered in alphabetical letters.

Returning to FIG. 9, the operation of the disc reproducing apparatus for reproducing the optical disc 1 is explained.

An optical pickup 2 reads out data recorded on the optical disc 1 and sends the read-out data or playback signals to a signal processing circuit 3. The signal processing circuit 3 waveform-shapes the reproduced signals and takes out audio data and subcoding data ancillary thereto from the playback signals and sends the data thus taken out to a D/A converting circuit and to a fixed terminal a of the interruption switch 7. The subcoding data is also supplied to the control circuit 4.

The format of the digital output fed to the interruption switch 7 is now explained.

This format is pursuant to a signal format standardized as to the digital transmission signal by the International Electrotechnical Commission (IEC).

FIGS. 15A and 15B illustrate the signal format of the digital interface.

In the signal format of the digital interface, each word is comprised of 32 bits in one sub-frame.

The left and right channels are not transmitted separately but are time-divisionally multiplexed in the order of left-right-left-right so that each sub-frame will be transmitted beginning from the lowermost bit. The signals are modulated in accordance with the so-called bi-phase mark and each bit of the original signal is represented by two bits.

Each sub-frame 200 is made up of a 4-bit synchronization preamble portion 201 from the LSB 0 to the third bit, a 4-bit spare portion 202 from the fourth bit to the seventh bit, a 20-bit audio data portion 203 from the 8th bit to the 27th bit, a one-bit V-bit portion 204 of the 28th bit, a one-bit V-bit portion 205 of the 29th bit, a 1-bit C-bit portion 206 comprised of the 30th bit, and a one-bit P-bit portion 207 comprised of the MSB.

The synchronization preamble portion 201 records synchronization data used for locating synchronization and for discrimination of the sub-frame 200.

The audio data portion 203 records audio data read out from the optical disc 1.

The V-bit portion 204 is used as a flag specifying whether or not the sub-frame data is valid, that is whether or not an error has been made.

The V-bit portion 205 is an area used for recording the subcode information. In the present embodiment, the U-bit portion is used as an area for recording the subcoding data having "6" recorded in the address bit block.

The C-bit portion 206 is an area used for recording the channel status, that is the properties of transmitted data, such as the sampling frequency, whether or not emphasis has been used, and so forth.

The P-bit portion 207 is an area in which parity bits are recorded, and is provided for detecting the error of data being transmitted and for perpetually maintaining the constant polarity of the synchronization signal.

Returning to FIG. 9, the control circuit 9 has a sub-Q processor 13, an address bit processor 14 and a pulse generator 15, and outputs processed data of the subcode Q-channel to the memory 5. The control circuit also controls the switching operation of the interruption switch 7.

The sub-Q processor 13 extracts data of the above-mentioned sub-code Q-channel from the subcoding data sent from the signal processing circuit 3 and sends the sub-code Q-channel data to the address bit processor 14.

The address bit processor 14 processes the above-mentioned address bit block of the sub-code Q-channel data to detect a subcoding frame which is "6" in order to output an operation on/off control signal to the pulse generator 15 depending on the results of detection. The subcoding frame is referred to hereinafter simply as text data.

That is, if there is such text data, and such text data has letter data, it is checked whether or not "1" is set in the MSB 345 of the subsidiary control area 33.

If "1" is set at the MSB 345, that is if the copying inhibition flag is set, an operation-on control signal is issued. If the copying inhibition flag is not set, an operation-off control signal is issued.

The pulse generator 15 is responsive to the operation on/off control signal to generate a pulse which is outputted as a changeover signal to the interruption switch 7. This pulse has a period and a width of $\frac{1}{75}$ msec and 1 mm sec, respectively.

Each subcoding frame is recorded at a period of $\frac{1}{75}$ second, as stated above. By interrupting the digital output every $\frac{1}{75}$ msec, part of each subcoding frame is invalidated. Moreover, interruption of the digital output for 1 msec each time invalidates about 10% of the subcoding frame which is $\frac{1}{75}$ sec or 13 msec long. If the digital output is invalidated to this extent, the digital output can be invalidated without the necessity of completely interrupting the digital output.

The flowchart of FIG. 16 shows the operation of the control circuit 4 during the time of interruption of the digital output of the above-mentioned disc reproducing apparatus.

After starting the readout of the TOC information, the sub-Q processor 13 judges at step S1 of FIG. 16 whether or not there is the subcoding frame having "6" written in the address bit block, that is the text data.

If the result of decision at step S1 is NO, that is if there is no text data, processing transfers to step S6 and, if the result of decision at step S1 is YES, that is if there is the text data, processing transfers to step S2.

At step S2, it is checked by the address processor 14 whether or not a copying inhibiting flag has been set for the text data having the letter data.

If the result of check at step S2 is NO, that is if no copying inhibition flag has been set for pre-set data of the text data, processing transfers to step S4. If the result of check at step S2 is YES, that is if the copying inhibition flag has been set for pre-set data of the text data, processing transfers to step S3.

At step S3, an output-obstructing pulse of 1 msec in width and 1'75 msec in period is outputted by the pulse generator 15 for interrupting the digital output of the text data for which the above-mentioned copying inhibition flag has been set.

At step S4, it is checked whether or not the readout of the text data has come to a close, that is whether or not the subcoding data being read out is the last part of the text data.

If the result of check at step S4 is NO, that is if there is left any text data to be read out, processing reverts to step S2. If the result of check at step S4 is YES, that is if the text data being read out is the last data, processing transfers to step S5.

At step S5, it is checked whether or not readout of the remaining portion of the TOC information has come to a close, that is if the subcoding frame being read out is the last subcoding frame.

If the result of check at step S5 is NO, that is if there is left any TOC information to be read out, processing at step S5 is continued. If the result of check at step S5 is YES, that is if the last subcoding frame of the TOC information has been read out, readout of the TOC information comes to a close.

Returning to FIG. 9, the subcode information produced by processing by the control circuit 4 is seized and stored by the memory 5. The subcode information is sent if necessary to a display apparatus, not shown, or to an output terminal of the digital signal, also not shown.

The D/A converter 6 converts the digital audio signals outputted by the signal processing circuit 3 into address audio signals, which are sent to an audio signal output terminal 8.

The interruption switch 7 has its fixed terminals a and b connected to the signal processing circuit and to ground, respectively. The interruption switch 7 operates for switching between one of these fixed terminals and a terminal c connecting to a digital terminal 9.

The switching operation occurs based on a switching signal sent from a pulse generator 15 in the control circuit 4. That is, in the present embodiment, the fixed terminal b and the terminal c are interconnected only for one second every 1/75 msec of the period responsive to the pulse sent from the pulse generator 15. Otherwise, the fixed terminal a and the terminal c are interconnected at all times.

By this switching operation, the digital output sent from the signal processing circuit 3 is interrupted and invalidated periodically. The digital output is not interrupted completely for relieving the load otherwise imposed on the pulse-generating PLL circuit generating a pulse used for synchronization with the digital signals on the reception side of the digital output sent from the digital terminal 9.

Figure 17:
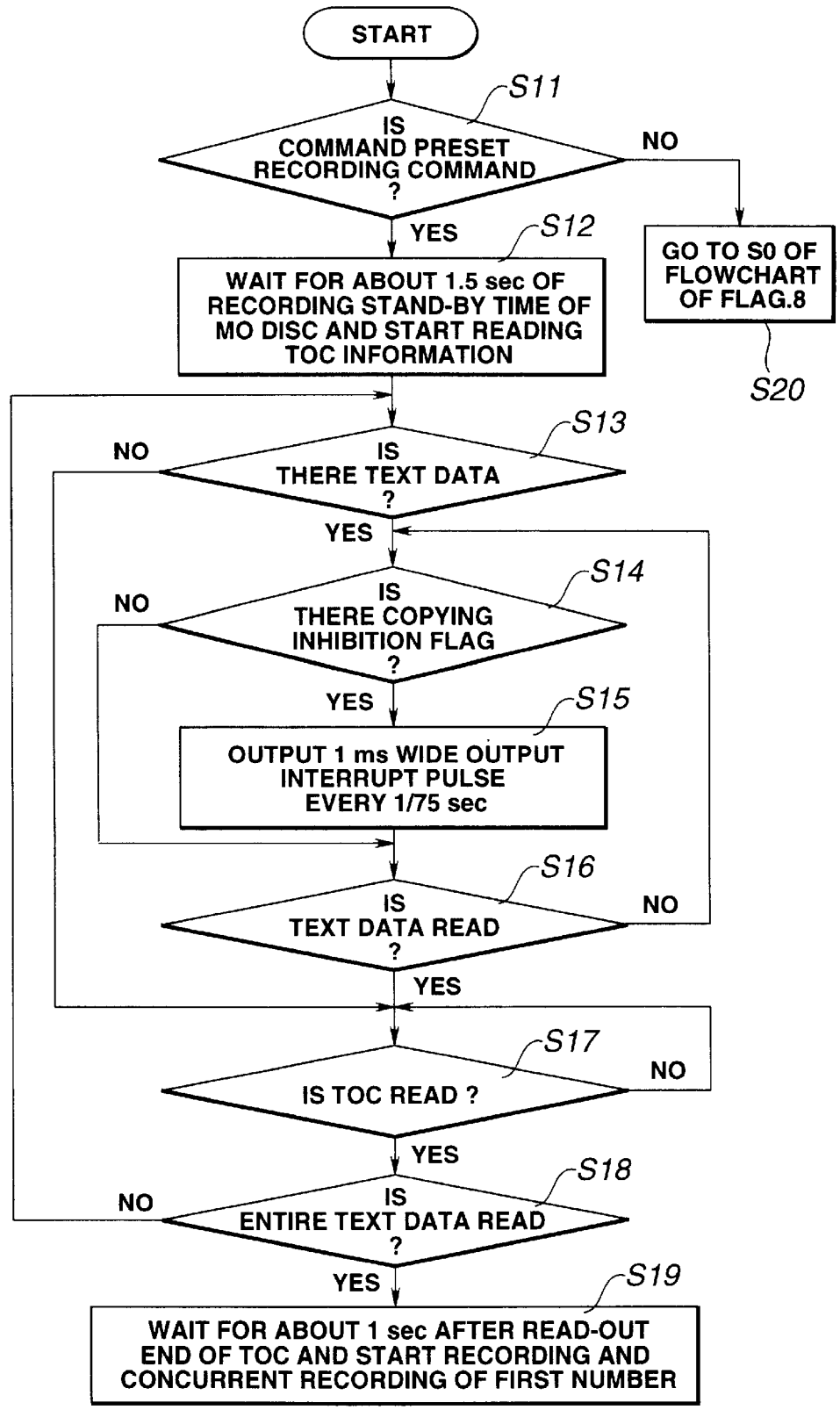
FIG. 17 is a flowchart for partially inhibiting duplication of a digital output in case of recording the recording contents of an optical disc on a magneto-optical disc.

The flowchart of FIG. 17 shows another example of the operation of copying from an optical disc to a magneto-optical disc in the above-mentioned disc reproducing apparatus.

After starting the operation, it is checked at step S11 whether or not a pre-set sound-recording command that is the a command exclusively used for commanding reproduction of the optical disc having recorded thereon the subcode information inclusive of the text data and concurrent recording on the magneto-optical disc has been entered.

If the result of check at step S11 is NO, that is if the pre-set recording command has not been entered, processing transfers to step S20 from which processing transfers to step S0 of the flowchart of FIG. 16 to perform the above-mentioned precessing.

If the result of check at step S11 is YES, that is if the pre-set recording command has been entered, processing transfers to step S12.

At step S12, the TOC information is read out after waiting for the recording waiting time for the magneto-optical disc of, for example, approximately 1.5 sec.

At step S13, it is checked whether or not the above text data is present in the above-mentioned sub-code Q-channel.

If the result of check at step S13 is NO, that is if there is no text data, processing transfers to step S17. If the result of check at step S13 is YES, that is if there is the text data, processing transfers to step S14.

At step S14, it is checked whether or not the above-mentioned copying inhibiting flag has been set for the text data having letter data.

If the result of check at step S14 is NO, that is if no copying inhibition flag has been set at a pre-set data of the text data, processing transfers to step S16. If the result of check at step S14 is YES, that is if the copying inhibition flag has been set at a pre-set data of the text data, processing transfers to step S15.

At step S15, an output obstructing pulse of the period of 1/75 msec and a period of 1 msec as stated above is outputted for interrupting a digital output of the text data for which the copy inhibiting flag has been set as described above.

At step S16, it is checked whether or not readout of the text data has come to a close, that is whether or not the subcoding frame being read out is the last text data.

If the result of check at step S16 is NO, that is if there is any text data yet to be read out, processing reverts to step S14. If the result of check at step S16 is YES, that is if the text data being read out is the last text data, processing transfers to step S17.

At step S17, it is checked whether or not readout of the remaining portion of the TOC information has come to a close, that is if the subcoding frame being read out is the last subcoding frame.

If the result of check at step S17 is NO, that is if there is left any TOC information to be read out, processing at step S17 is continued. If otherwise, that is if the last subcoding frame of the TOC information has been read out, processing transfers to step S18.

At step S18, it is checked whether or not readout of the entire text data has come to a close.

If the result of check at step S18 is NO, that is if there is left any text data to be read out, processing returns to step S13. If the result of check at step S18 is YES, that is if there is no text data to be read out, processing transfers to step S19.

At step S19, readout of the TOC information comes to a close. After pause of about one second, reproduction of the first number of the optical disc and concurrent recording on the magneto-optical disc is started.

In the conventional system, when an optical disc in which a pre-set flag, such as "6", is set in a portion of the TOC information, for example, in the address bit block of the subcode Q-channel, and the text data has been recorded in the subcoding frame where the address 6 flag has been set, is reproduced, the conventional practice has been to output the above sub-code channel unconditionally along with other audio data for digital transmission. With the above-described structure of the disc reproducing apparatus, a copying inhibiting flag may be set in a pre-set data of the subcoding frame where the above address 6 flag is set, this flag so set may be detected and the digital output may be invalidated responsive to the result of detection for a pre-set time, for example, during the time of outputting the TOC information.

For example, if rights are accrued in the above text data, and the data recorded on the optical disc is transmitted, only the portion of the TOC information may be selectively invalidated if the specified flag inhibiting copying of the text data where the rights have accrued is set. Since the audio data can be digitally transmitted while the text data remains invalid, the text data in which the rights have accrued can be prevented from being copied illicitly.

In the foregoing, setting a copying inhibiting flag in a subcoding frame of a portion of the management area of the optical disc has been explained. Recently, researches into setting a copying inhibiting flag in the program area is also underway.

In such case, if the interruption switch 7 is provided outside of the signal processing circuit 3, and the digital output obtained on precessing by the signal processing circuit 3, as shown in FIG. 9, there is a risk of interruption of audio signals recorded in the program area.

Figure 18:
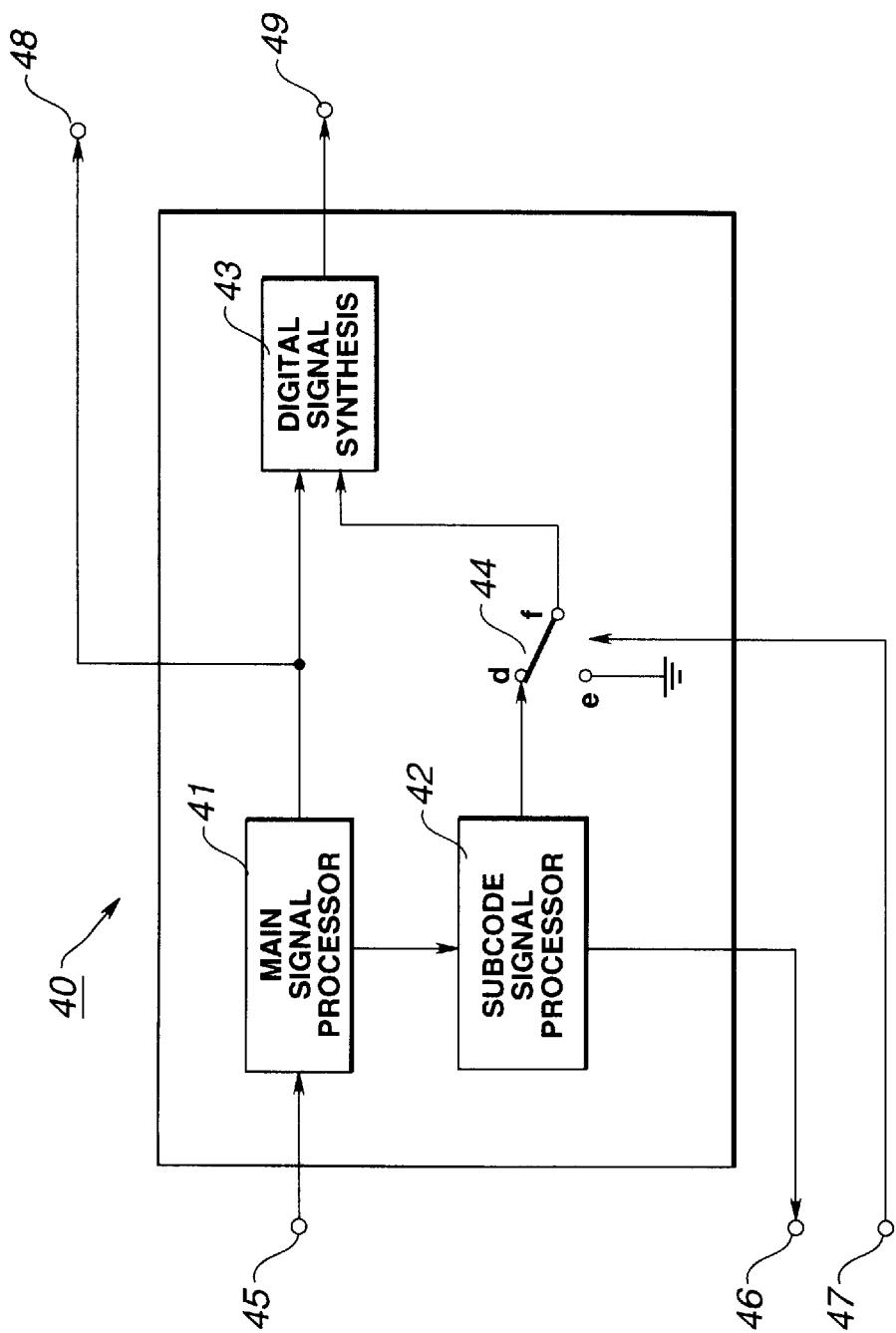
FIG. 18 is an illustrative block diagram of a signal processing circuit 3 of FIG. 9 according to the present invention.

In this consideration, an interruption switch 44 is provided within the signal processing circuit 3 for interrupting only the subcode information, as shown in FIG. 18.

Referring to FIG. 18, a signal read out by the optical pickup 2 is sent via an input terminal 45 to a main signal processor 41.

The main signal processor 41 shapes the waveform of the signal sent via an input terminal 45 for conversion into a bi-level signal. The main signal processor 41 sends the subcode information portion to a subcode signal processor 42, while sending the audio signal portion to a digital output synthesis unit 43 and to an audio output terminal 48.

The audio signal portion is sent from the audio signal output terminal 48 to the D/A conversion circuit 6 for conversion into an analog audio signal.

The subcode signal processor 42 extracts the subcode Q-channel data from the subcode portion and sends the extracted signal to an output terminal 46, while sending the subcode Q-channel data to a fixed terminal d of the interruption switch 44.

The subcode Q-channel data is also sent from the output terminal 46 to the control circuit 4 for detecting the copying inhibition flag.

The digital output synthesis unit 43 synthesizes the audio signal sent from the main signal processor 41 and the data of the subcode Q-channel sent via the interruption switch 44 to form a signal for transmission, based on the signal format of the digital interface shown in FIG. 15, and sends the synthesized signal as a digital output to an output terminal 49. Meanwhile, the data of the subcode-Q channel is handled as data of the above-mentioned U-bit portion 205.

The interruption switch 44 switched between the fixed terminal d and another fixed terminal e, the opposite end of which is grounded, based on the above-mentioned switching signal, for interconnection with the terminal f. That is, the data of the subcode-Q channel is interrupted periodically.

As the switching signal, the above-mentioned pulse having the period of $1/7.5$ msec and a width of approximately 1 msec is used.

Referring to FIG. 10, if the copying inhibiting flag is written in an area other than the TOC information, for example, in the program area, it becomes possible to select and invalidate only the data of the subcode Q-channel where the copying inhibiting flag is recorded. Therefore, if its attempted to invalidate the text data, there is no ill effect on the audio data as the main data.

The text data having the copying inhibiting flag recorded therein can be invalidated in the case of an optical disc in the subcoding frame of a portion of the management area of which the copying inhibiting flag has been recorded.

What is claimed is:

1. A disc reproducing apparatus for reproducing from a disc main data, management data for managing the main data, and subsidiary data ancillary to the main data, comprising:

readout means for reading out the main data, the management data, and the subsidiary data from the disc;

outputting means for digitally outputting the main data and the subsidiary data;

detection means for detecting a flag specifying one of inhibition and permission of digitally outputting the subsidiary data read out by the readout means; and control means for controlling one of the inhibition and permission of digitally outputting the subsidiary data by the outputting means in accordance with the flag detected by the detection means, so as to prevent copying of the subsidiary data to another medium.

2. The disc reproducing apparatus as claimed in claim 1 wherein the disc-shaped recording medium is made up of a management area and a program area;

said management area has the subsidiary data and the management data recorded therein; and wherein outputting of the subsidiary data by the outputting means is one of inhibited and permitted based on a flag specifying one of the inhibition and permission of the digital output included in the subsidiary data recorded in the management area.

3. The disc reproducing apparatus as claimed in claim 1 wherein the disc-shaped recording medium is made up of a management area and a program area;

said management area has the subsidiary data and the management data recorded therein; said program area has recorded therein said subsidiary data along with the main data; and wherein outputting of the subsidiary data by the outputting means is one of is one of inhibited and permitted based on a flag specifying one of inhibition and permission of the digital output included in the subsidiary data recorded in the program area.

4. The disc reproducing apparatus as claimed in clam 1 wherein the subsidiary data is the letter information concerning the disc-shape recording medium and the program recorded on the disc-shape recording medium.

5. The disc reproducing apparatus as claimed in clam 1 wherein the main data is audio data and wherein said subsidiary data is at least one of the name of the disc-shape recording medium, name of the performer, name of the composer, name of the lyricist, name of the arranger, name of the publisher and date or production.

6. In a disc-shape recording medium comprising main data, management data for managing the main data, and subsidiary data ancillary to the main data, the improvement comprising:

a flag present in the subsidiary data, said flag being digitally outputted by a disc reproduction apparatus and being capable of detection by the disc reproduction apparatus for one of inhibiting and permitting duplication of subsidiary data present on the disc.

7. The disc-shaped recording medium as claimed in claim 6 wherein the recording medium is made up of a management area and a program area, said management area has the subsidiary data and the management data recorded therein, and wherein the identifier for one of inhibiting and permitting duplication of said subsidiary data is included in the subsidiary data recorded in the management area.

8. The disc-shaped recording medium as claimed in claim 6 wherein the recording medium is made up of a management area and a program area, said management area has the subsidiary data and the management data recorded therein, said subsidiary data is recorded along with the main data in said program area, and wherein the identifier for one of inhibiting and permitting duplication of said subsidiary data is included in the subsidiary data recorded in the program area.

9. The disc-shaped recording medium as claimed in claim 6 wherein the subsidiary data is the letter information concerning the disc-shaped recording medium and the program recorded on the disc-shaped recording medium.

10. The disc-shaped recording medium as claimed in claim 6 wherein the main data is audio data and wherein said subsidiary data is at least one of the name of the disc-shaped recording medium, name of the performer, name of the composer, name of the lyricist, name of the arranger, name of the publisher and date of production.

* * * * *

UNITED STATES PATENT AND TRADEMARK OFFICE
CERTIFICATE OF CORRECTION

PATENT NO. : 5,825,731
DATED : October 20, 1998
INVENTOR(S) : TEPPEI YOKOTA

It is certified that error appears in the above-indentified patent and that said Letters Patent is hereby corrected as shown below:

In Col. 16, line 49, the phrase "is one of" is repeated.

In Col. 16, line 54, "clam 1", should be --"claim 1".

In Col. 16, line 58, "clam 1" should be --"claim 1".

Signed and Sealed this

Twelfth Day of October, 1999

*Attest:*

Q. TODD DICKINSON

*Attesting Officer*      *Acting Commissioner of Patents and Trademarks*